United States Patent
Lopez

(10) Patent No.: US 6,697,993 B1
(45) Date of Patent: Feb. 24, 2004

(54) TRANSMISSION AND RECEPTION METHODS AND DEVICES IN A TRANSMISSION SYSTEM COMPRISING CONVOLUTIONAL INTERLEAVING/DEINTERLEAVING

(75) Inventor: Patrick Lopez, Livré s/Changeon (FR)

(73) Assignee: Thomson Licensing S.A., Boulogne Cedex (FR)

( * ) Notice: Subject to any disclaimer, the term of this patent is extended or adjusted under 35 U.S.C. 154(b) by 340 days.

(21) Appl. No.: 09/706,638

(22) Filed: Nov. 6, 2000

(30) Foreign Application Priority Data

Nov. 8, 1999  (EP) .............................................. 99402782

(51) Int. Cl.$^7$ ............................................. H03M 13/03
(52) U.S. Cl. ....................................... 714/786; 714/755
(58) Field of Search ................................. 714/762, 755, 714/782, 763, 786; 395/145

(56) References Cited

U.S. PATENT DOCUMENTS

| | | | | |
|---|---|---|---|---|
| 4,964,128 A | * | 10/1990 | Sako et al. ................... | 714/762 |
| 4,972,417 A | * | 11/1990 | Sako et al. ................... | 714/755 |
| 5,928,376 A | * | 7/1999 | Dettmar et al. .............. | 714/782 |
| 6,308,296 B1 | * | 10/2001 | Sasaki ......................... | 714/763 |
| 6,525,855 B1 | * | 2/2003 | Westbrook et al. .......... | 359/145 |

FOREIGN PATENT DOCUMENTS

| | | | |
|---|---|---|---|
| EP | 0310089 | 9/1988 | |
| GB | 2332836 | 6/1998 | ............ H04N/7/64 |

* cited by examiner

*Primary Examiner*—David Ton

(57) ABSTRACT

A method for feeding a convolutional interleaver or deinterleaver with dummy data at least until the memory of the interleaver or deinterleaver contains only dummy data, and discarding data output by the interleaver or deinterleaver during the feeding of the dummy data. The method may be implemented in transmitters or receivers.

12 Claims, 5 Drawing Sheets

TRANSMISSION AND RECEPTION METHODS AND DEVICES IN A TRANSMISSION SYSTEM COMPRISING CONVOLUTIONAL INTERLEAVING/ DEINTERLEAVING

BACKGROUND OF THE INVENTION

The invention concerns a method and a device for initializing convolutional interleavers at a receiver and/or a transmitter. The invention particularly applies in the frame of BRAN HIPERLAN 2 systems.

It has been proposed to include a convolutional interleaver, respectively deinterleaver in the data link control layer of a transmitter, respectively receiver, between the inner and outer error correction code encoders, respectively decoders.

The fact that a convolutional interleaver contains undetermined data at the establishment of a connection between a transmitter and a receiver results in undetermined data being sent by the receiver's deinterleaver to the outer error code decoder. This may induce undesired behavior of the receiver.

SUMMARY OF THE INVENTION

The object of the invention is a method for transmission in a transmission system employing convolutional interleaving, characterized in that it comprises the steps of:

initiating a connection with at least one receiver;

applying an outer error encoding to dummy data;

feeding a convolutional interleaver with said error encoded dummy data at least until the memory of said interleaver contains only said error encoded dummy data; and discarding data output by said interleaver during the previous step.

According to a particular embodiment of the invention, the method further comprises the steps of:

feeding said interleaver with useful data; and transmitting data output by said interleaver.

According to a particular embodiment of the invention, said dummy data consists in dummy protocol data units.

Another object of the invention is a method for reception in a transmission system employing convolutional interleaving, characterized in that, it comprises the steps of:

feeding a convolutional deinterleaver with interleaved error encoded dummy data at least until the memory of said deinterleaver contains only said error encoded dummy data;

discarding data output by said deinterleaver during the previous step.

According to a particular embodiment of the invention, the method further comprises the steps of:

receiving data from a transmitter, deinterlacing and error correcting said data.

According to a particular embodiment of the invention, the method further comprises the step of discarding deinterlaced error corrected dummy data.

The invention permits to provide a quasi error free (QEF) service quality for isochronous streams (such as audio/video streams) which by nature is not adapted to rely on an automatic repeat mechanism. It also guarantees that the receiver/decoder correctly processes all bytes transmitted during the connection. The inventive process allows to deal with the undetermined state of memories required by this convolutional coding scheme.

Another object of the invention is a transmitter in a transmission system employing convolutional interleaving, characterized in that it comprises an error correction encoder;

a convolutional interleaver;

means for generating dummy data, feeding said dummy data to the error correction encoder and for feeding said encoded dummy data to the convolutional interleaver at least until the memory of said interleaver contains only said dummy data, and for discarding data output by said interleaver during said feeding of dummy data.

Another object of the invention is a receiver in a transmission system employing convolutional interleaving, characterized in that it comprises a convolutional deinterleaver;

an error correction circuit;

means for generating error correction encoded interleaved dummy data and for feeding said dummy data to said deinterleaver until the memory of said deinterleaver contains only dummy data, and for discarding data output by said deinterleaver during said feeding of dummy data.

BRIEF DESCRIPTION OF THE DRAWINGS

Other characteristics and advantages of the invention will appear through the description of a non-limiting embodiment of the invention, described in reference to the attached drawings, among which.

DETAILED DESCRIPTION OF THE INVENTION

The present embodiment will be described in reference to the Broadband Radio Access Network (BRAN) High Performance Local Radio Network Type 2 (HIPERLAN 2) specifications developed within the frame of the European Telecommunications Standards Institute (ETSI).

While a number of different BRAN HIPERLAN documents describe the different layers of the system, the present invention concerns more particularly technical topics covered by the following documents:

(a) BRAN HIPERLAN 2 Functional Specification Part 1—Physical (PHY) Layer (b) BRAN HIPERLAN 2 Functional Specification Data Link Control (DLC) Layer Part 1—Basic Data Transport Function (c) BRAN HIPERLAN 2 Functional Specification Data Link Control (DLC) Layer Part 4—Extension for Home Environment V 0.b (August 1999)

The HIPERLAN environment uses a TDMA scheme for radio frequency channel access. A central device (Central Controller or 'CC') manages radio frequency medium access requests of transmitters/receivers (Mobile Terminals or 'MTs'). A Medium Access Control (MAC) frame structure containing transport channels is defined. Transmitters map logical channels—i.e. for example point-to-point connections—to the transport channels, in the appropriate fields of the MAC frame. Elementary packet formats and names (IEs, PDUs, . . . ) differ for each transport channel. The embodiment will be described in reference to Protocol Data Units (PDUs) of a certain format, but is not limited to this example.

Figure 1:
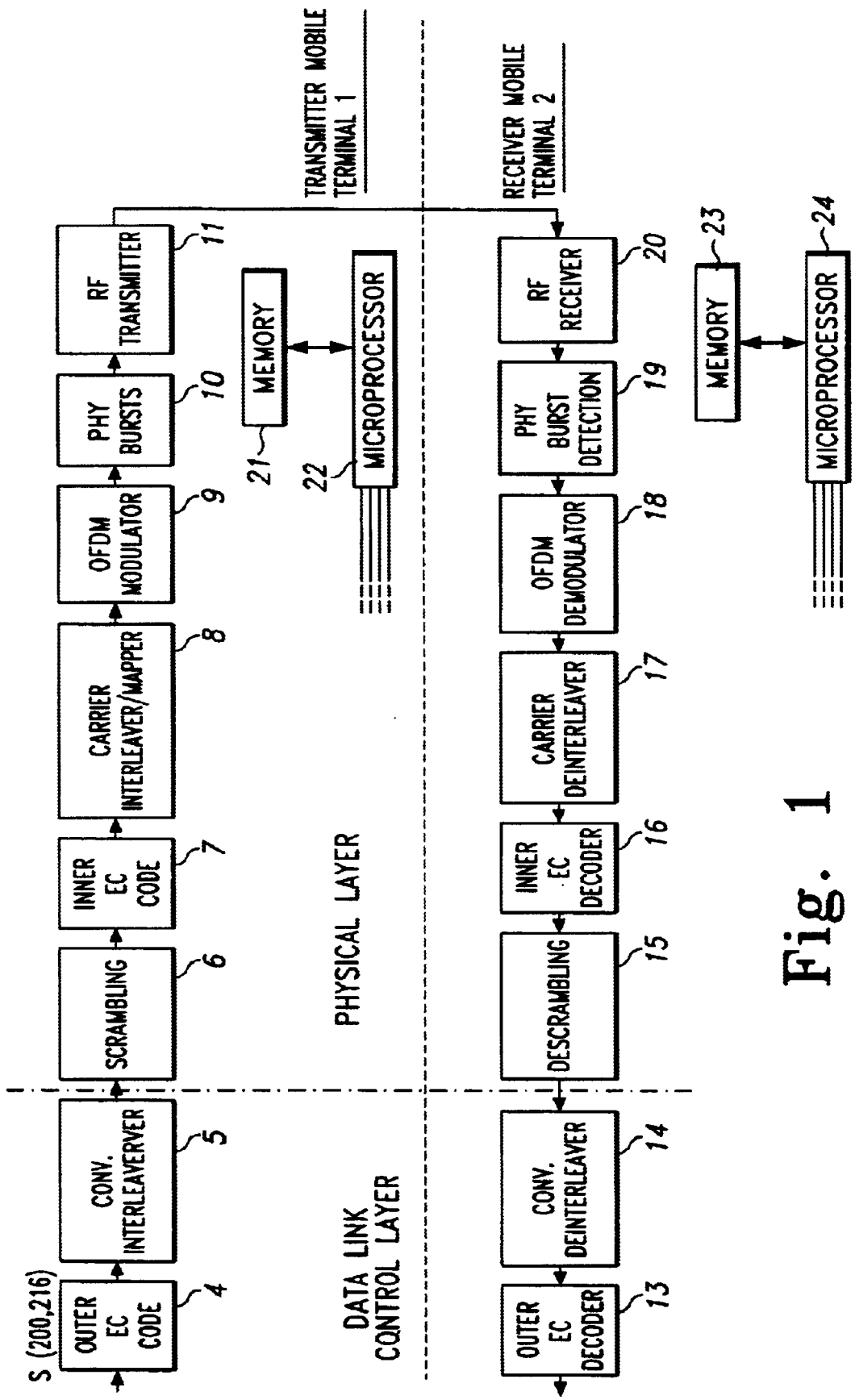
FIG. 1 is a schematic diagram of a transmitter and a receiver according to the present invention.

FIG. 1 is a schematic diagram of two mobile terminals ('MTs'), one of which having the role of a transmitter (1), the other having the role of a receiver (2). Data to be transmitted is prepared at layers above, and including, the convergence layer (CL—not illustrated), and handed over to the Data Link Control (DLC) layer, followed by the Physical (PHY) layer.

According to the present embodiment, the DLC layer implements a block-type error correction code as outer error correction code, in this case a Reed-Solomon (RS) code. The RS encoder 4 works on data blocks comprising a number of PDU packets, four packets according to the present embodiment. It adds a number of redundant bytes to the block of PDU packets. The resulting block is then interleaved by a convolutional interleaver 5. This interleaver will be described in more detail later. The interleaved blocks are then scrambled by a scrambler 6. An inner error correction code, of the convolutional type, is applied by encoder 7. The resulting data is block interleaved (circuit 9) and mapped onto OFDM symbol carriers according to one of the allowed digital modulations. OFDM symbols are then concatenated into bursts (circuit 10) and sent over the transmission medium by circuit 11. Elements 12 to 20 of the receiver have functions which are symmetric of those of elements 3 to 11 of the transmitter.

The transmitter moreover comprises a memory 21 connected to a microprocessor 22. According to the present embodiment, the microprocessor 22 controls the operation of the transmitter. Similarly, the receiver comprises a memory 23 and a microprocessor 24.

Figure 2:
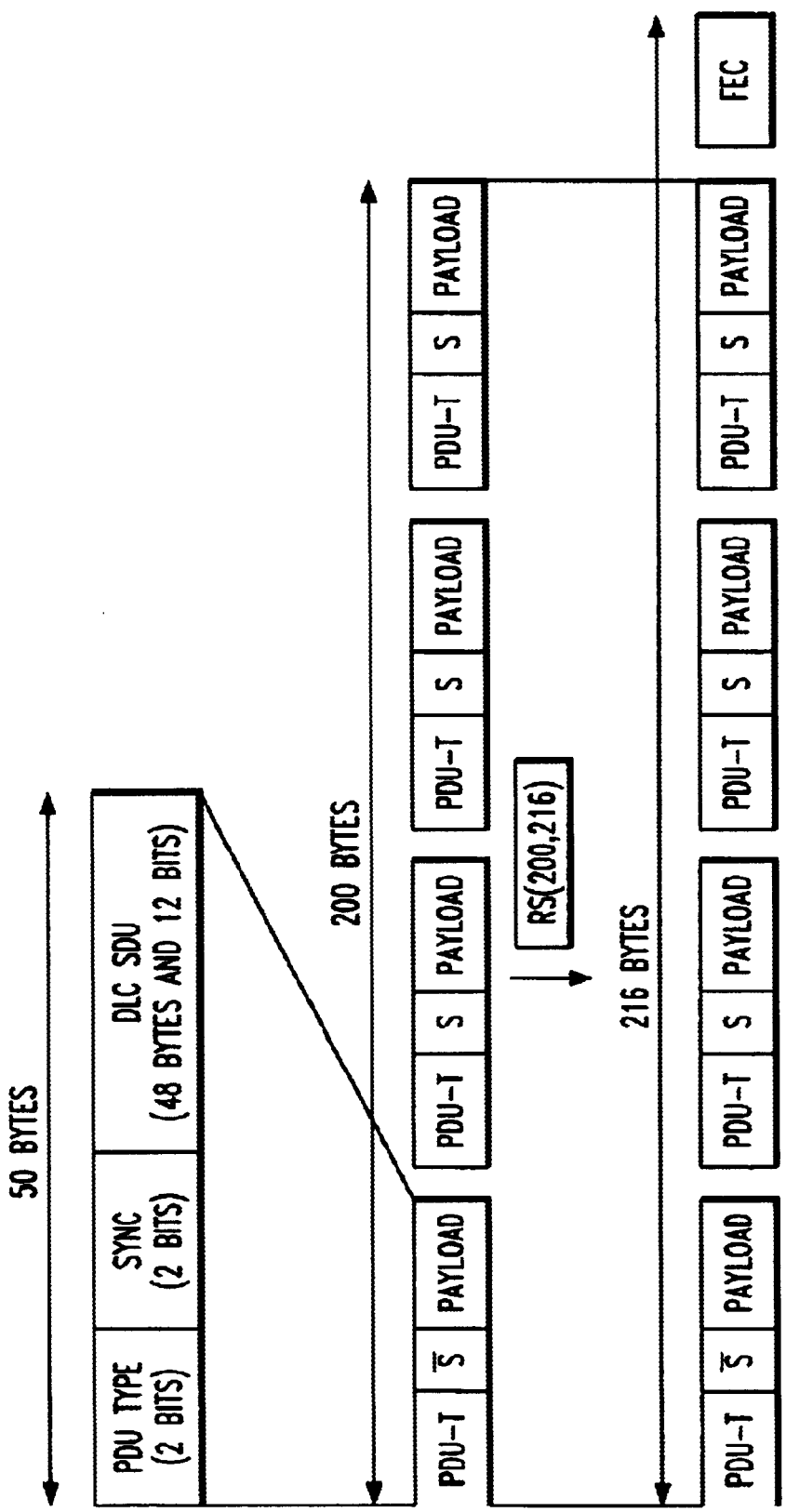
FIG. 2 is a schematic diagram of a Reed Solomon codeword generation process used by the transmitter of FIG. 1, FIGS. 3a and 3b are respectively diagrams of a convolutional interleaver and deinterleaver used in the transmitter, respectively receiver of FIG. 1.

FIG. 2 illustrates the process, implemented by RS encoder 4, of concatenating four PDU packets of fifty bytes each into one block of two-hundred bytes and adding the appropriate redundant sixteen byte data. The RS encoder according to the present embodiment is a (200,216) encoder. The RS encoder in itself is of the conventional type. For transmission, the PDU packets and the RS redundant bytes are interleaved, each PDU packet being followed by four RS redundant bytes.

Figures 3A, 3B:
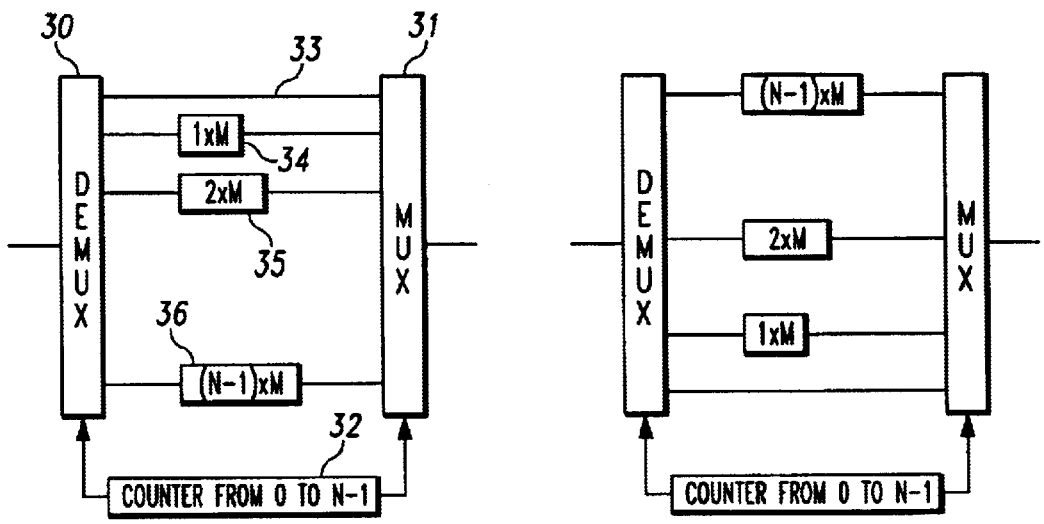

FIGS. 3a and 3b are respectively diagrams of the convolutional interleaver 5 and the convolutional deinterleaver 14. The interleaver 5 will be described in more detail. The interleaver includes a demultiplexer 30, comprising an input and N outputs, each output being connected to a delay line. A counter 32 cyclically selects every output every N counts. Only a few delay lines are illustrated (lines 33 to 36). The delay lines each introduce a delay of X×M, where X varies between 0 and N−1, and M represents an elementary delay line size. The first delay line 33 introduces no delay, the second line 34 introduces a delay of 1×M, . . . while the last line 36 introduces a delay of (N−1)×M. The interleaver also comprises a multiplexer 31 connected to the outputs of the delay lines. The multiplexer 31 is controlled by counter 32 so as to select the same delay line as demultiplexer 30.

The deinterleaver 14 has a structure symmetric to that of interleaver 5, so as to eliminate the delays introduced during interleaving. In particular, the order of the delay lines is inverted.

According to the present embodiment, N is taken equal to 9 and M is taken equal to 24. Thus N×M=216, the size of a Reed Solomon codeword length. According to this embodiment, the maximum delay introduced by the interleaver is (N−1)×216 and the total memory required for each of the devices 5 or 14 is ((N−1)/2)×216 bytes. Obviously, other values for M and N and for the RS codeword size than those indicated here may be selected according to the desired application.

In order to enable the deinterleaver of the receiver to process correctly the data it receives, a byte which has been delayed with the maximum delay by the interleaver of the transmitter has to be sent to the minimum delay line of the deinterleaver, while a byte which has not been delayed at the transmitter has to support the maximum delay at the receiver. The receiver thus has to be able to synchronize its deinterleaver on the incoming data. According to the present embodiment, the receiver detects the start of a 216 byte RS code word by analyzing synchronization bits of the PDU packets included in this code word.

The period of the interleaver and of the deinterleaver is N, so synchronization may be made every N bytes. Advantageously, the values of N, M and the size of the RS codeword are chosen such that N divides the size of the codeword. This is the case for the values of N, M and the codeword size given in the present example. In this case, the beginning of an RS codeword may be used to synchronize the deinterleaver on the interleaver.

The method used for detecting the beginning of an RS codeword will now be described. FIG. 2 shows the contents of a PDU packet. A PDU packet starts with two synchronization bits, followed by two bits identifying the PDU type. Synchronization is achieved by setting, at the receiver, the synchronization bits of the first PDU of an RS code word to a predefined value, known by the receiver, different from that of the other PDUs of the RS code word. According to the present embodiment, the synchronization bits are set to '11' for the first PDU packet in the RS code word and to '00' for subsequent PDUs. The receiver, using appropriate means such as a microprocessor or a dedicated integrated circuit, detects the presence of the synchronization bits with value '11', and thus identifies the first PDU. The interleaver of the transmitter is such that the first byte of the first PDU of the RS codeword is sent through the delay-less line of the interleaver. The receiver resets the counter of its deinterleaver upon detection of the synchronization bits indicating a codeword start, so that the byte is sent through the line with maximum delay.

When a Data Link Control User Connection ('DUC') is set up between the transmitter and the receiver, the memories of the delay lines of the interleaver and the deinterleaver are in an undetermined state. The receiver's deinterleaver 14 processes this non-significant memory content and sends it to the Reed Solomon decoder 13. The Reed Solomon decoder will not know that these 8×216 bytes are non-significant, and will detect a high number of errors. This can induce receiver reactions depending on its higher software layers.

According to the present embodiment, the memories of the transmitter's interleaver and the receiver's deinterleaver are purged after connection set-up, in order to always provide coherent data at the output of the interleaver and the deinterleaver. This is done by having the DLC layers generate, at the transmitter and at the receiver, a number of dummy PDUs after connection set-up. Of course, the transmitter generates the dummy PDUs before sending relevant PDUs. Dummy PDUs are identified by a specific value of the PDU type field. Dummy PDUs are automatically discarded by the DLC layer, both in the transmitter and in the receiver, after having been Reed Solomon coded and interlaced, respectively deinterlaced and Reed Solomon corrected.

According to the present embodiment, in order to purge the memories of both transmitter and receiver interleavers, eight blocks of four consecutive dummy PDUs are generated. These eight blocks of four PDUs correspond to the sum of the memory content of both transmitter and receiver interleavers.

Four consecutive dummy PDUs of 54 byte length correspond to one Reed Solomon codeword. The format of each PDU is given in Table 1. The RS encoder of the transmitter appends 16 bytes to each 200-byte block. These 16 bytes are spread over the four PDUs by appending four bytes to each PDU, as illustrated by FIG. 2.

TABLE 1

| Data field | Value/Length |
|---|---|
| PDU type | '01' (Dummy PDU) |
| Synchronization bits | '11' for first PDU in RS code word |
|  | '00' for all other PDUs in RS codeword |
| Payload | 48 bytes and 12 bits |
| RS code | 4 bytes (out of 16 for a whole codeword) |
| Total | 54 bytes |

Figure 5:
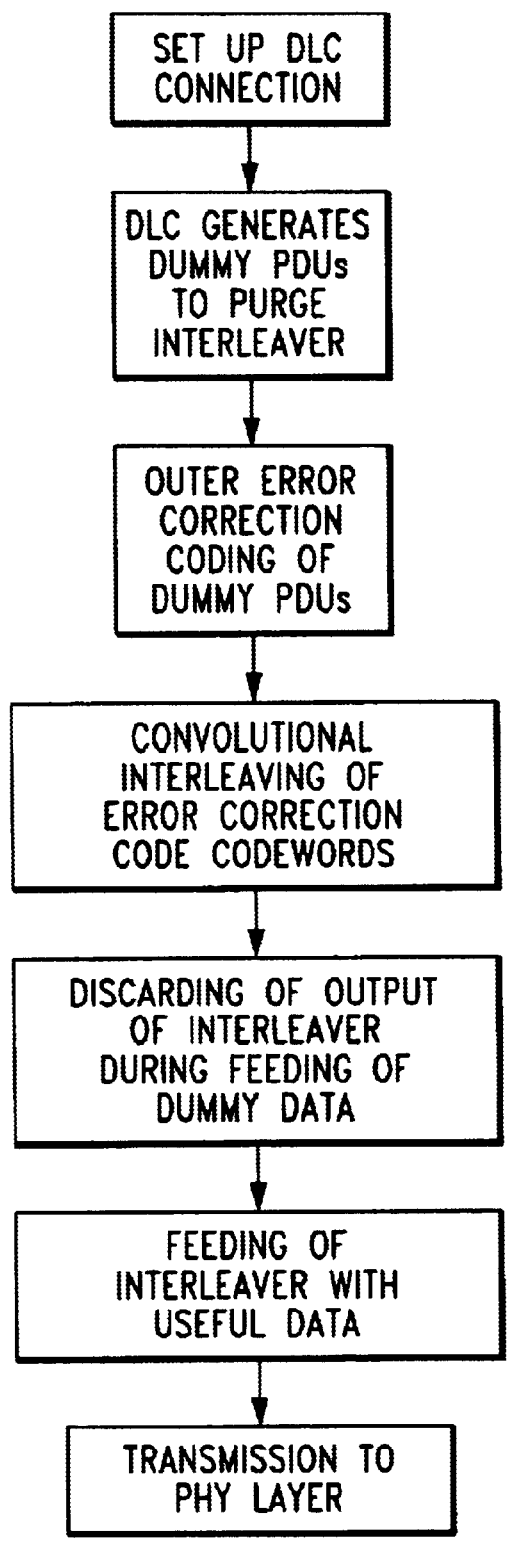
FIG. 5 is a flowchart of the process at the transmitter.

When a connection is to be established, the process at the transmitter is the following (see FIG. 5):

set-up of the DLC user connection upon request of the transmitter, following the rules established in the reference documents (a) to (c), after set-up, generation of a series of eight dummy PDUs by the DLC layer of the transmitter (this may be accomplished by the microprocessor of the transmitter, executing appropriate program code), outer error correction coding of the dummy PDUs by the DLC layer of the transmitter (circuit 4), convolutional interleaving (circuit 5) of the resulting RS codewords, discarding by the DLC layer (under control of the microprocessor) of the data output by the interleaver 5 during the interleaving of the two RS codewords, feeding of the interleaver 5 with useful data coming from the RS encoder 4, passing of the data output by the interleaver to the Physical layer (PHY) for transmission to the receiver.

Figure 6:
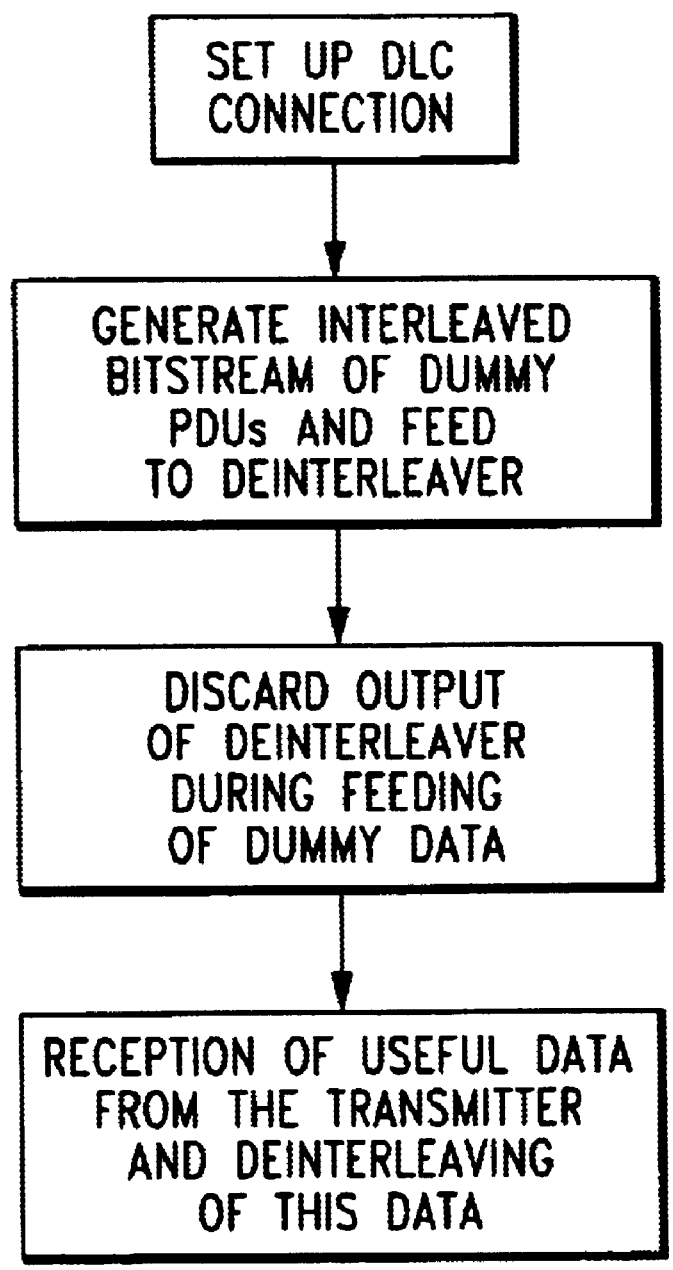
FIG. 6 is a flowchart at the receiver.

When a connection is established, the process at the receiver is the following (see FIG. 6):

after set-up of the DLC user connection, generation of an interleaved bitstream of dummy PDUs and having a length of eight dummy PDUs (including RS redundant bytes) by the DLC layer of the receiver. This interleaved stream is fed to the convolutional deinterleaver 14 of the receiver. The stream is identical to that which would have been generated at the output of the convolutional interleaver 14 if it were continuously fed with dummy PDUs, discarding by the DLC layer of the receiver of the data output of the deinterleaver during the processing of the dummy PDU stream, reception of the useful data from the transmitter and deinterleaving of that data.

Thus the receiver's outer error code correction circuit will see only dummy PDUs, comprising correct redundant bytes. The dummy PDU data sent by the transmitter will form full dummy PDU packets with the data present in the memory of the deinterleaver. Thus, the error correction circuit of the receiver will correctly process the dummy PDU packets.

According to the present embodiment, when the connection is to be terminated, the transmitter has to purge both the transmitter interleaver and the receiver deinterleaver in order to ensure that all data has been output. For this purpose, the transmitter also adds dummy PDUs but appended to the end of the useful data provided by the convergence layer.

Figure 4:
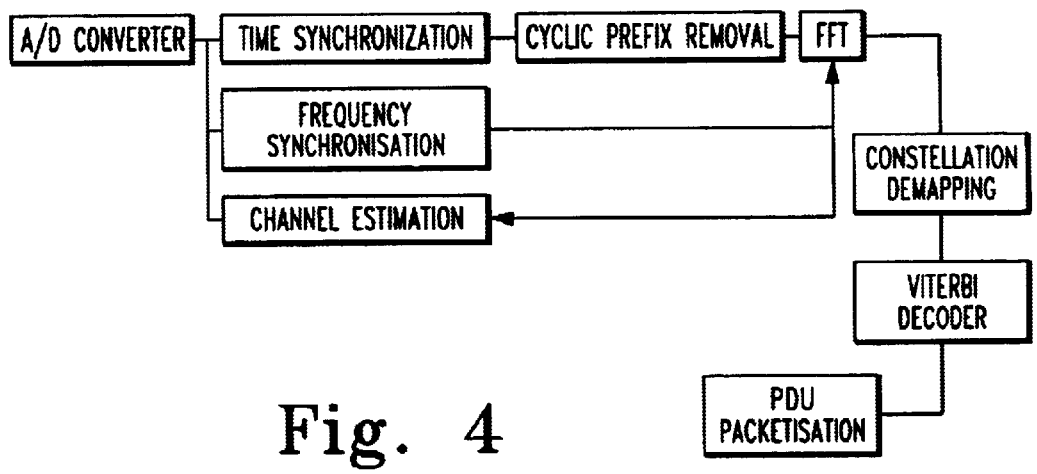
FIG. 4 is a schematic diagram of the demodulation part of the receiver of FIG. 1.

For information purposes, FIG. 4 is a diagram of the demodulation part of the receiver.

What is claimed is:

1. Method for transmission in a transmission system employing convolutional interleaving comprising the steps of:

initiating a connection with at least one receiver;

applying an outer error encoding to dummy data;

feeding a convolutional interleaver with said error encoded dummy data at least until the memory of said interleaver contains only said error encoded dummy data; and discarding data output by said interleaver during the previous step.

2. Method according to claim 1, further comprising the steps of:

feeding said interleaver with useful data; and transmitting data output by said interleaver.

3. Method according to claim 1, wherein that said dummy data consists in dummy protocol data units.

4. Method according to claim 3, wherein the first dummy protocol data unit fed to the convolutional interleaver comprises a synchronization word for distinguishing it from following dummy protocol data units.

5. Method according to claim 1, carried out in a HIPERLAN 2 environment, with the steps of:

setting up of a DLC user connection upon request of a transmitter, after set-up, generation of eight dummy protocol data units by a DLC layer of the transmitter, outer error correction coding of the dummy protocol data units by the DLC layer of the transmitter, convolutional interleaving of the codewords resulting from the previous step, discarding by the DLC layer of the data output by the interleaver during the interleaving of the codewords, feeding of the interleaver with useful data coming from the outer error correction encoder, passing of the data output by the interleaver to a Physical layer.

6. Method for reception in a transmission system employing convolutional interleaving, comprising the steps of:

feeding a convolutional deinterleaver with interleaved error encoded dummy data at least until the memory of said deinterleaver contains only said error encoded dummy data;

discarding data output by said deinterleaver during the previous step.

7. Method according to claim 6, further comprising the steps:

receiving data from a transmitter, deinterlacing and error correcting said data.

8. Method according to claim 6, further comprising the step of discarding deinterlaced error corrected dummy data.

9. Method according to claim 8, wherein the first dummy protocol data unit fed to the convolutional interleaver comprises a synchronization word for distinguishing it from following dummy protocol data units.

10. Method according to claim 6, carried out in a HIPERLAN 2 environment and comprising the steps of:

setting up a DLC connection;

after set-up of the DLC user connection, generating of an interleaved bitstream of dummy protocol data units and having a length of eight units, including RS redundant bytes, by the DLC layer of the receiver feeding of this interleaved bitstream to the convolutional deinterleaver, discarding by the DLC layer of the receiver of the data output of the deinterleaver during the processing of the dummy PDU stream, reception of useful data from the transmitter and deinterleaving of that data.

11. Transmitter in a transmission system employing convolutional interleaving, comprising an error correction code encoder;

a convolutional interleaver;

means for generating dummy data, for feeding said dummy data to the error correction encoder and for feeding said encoded dummy data to the convolutional interleaver at least until the interleaver contains only said dummy data, and for discarding data output by said interleaver during said feeding of dummy data.

12. Receiver in a transmission system employing convolutional interleaving, comprising a convolutional deinterleaver;

an error correction code decoder;

means for generating error correction encoded interleaved dummy data and for feeding said dummy data to said deinterleaver until the memory of said deinterleaver contains only dummy data, and for discarding data output by said deinterleaver during said feeding of dummy data.

\* \* \* \* \*